United States Patent Office 3,525,719
Patented Aug. 25, 1970

3,525,719
PROCESS FOR THE PRODUCTION
OF POLYAMIDES
Hans Helmut Schwarz and Karl Heinz Hermann, Krefeld-Bockum, Hermann Schnell, Krefeld-Uerdingen, and Friedhelm Roederer, Krefeld-Bockum, Germany, assignors to Farbenfabriken Bayer Aktiengesellschaft, Leverkusen, Germany, a corporation of Germany
Filed Mar. 1, 1968, Ser. No. 709,766
Claims priority, application Germany, Mar. 10, 1967,
F 51,781
Int. Cl. G08g 41/00
U.S. Cl. 260—78
4 Claims

ABSTRACT OF THE DISCLOSURE

The invention relates to an improvement in the process for the production of polyamides by continuous polymerisation of cyclic lactams in the presence of alkaline catalysts by introducing preheated lactam and catalyst separately into a mixing zone and thereafter carrying out polymerisation under streaming and adiabatic conditions in a reaction zone, and to an apparatus for carrying out the polymerisation.

---

Figure 1:
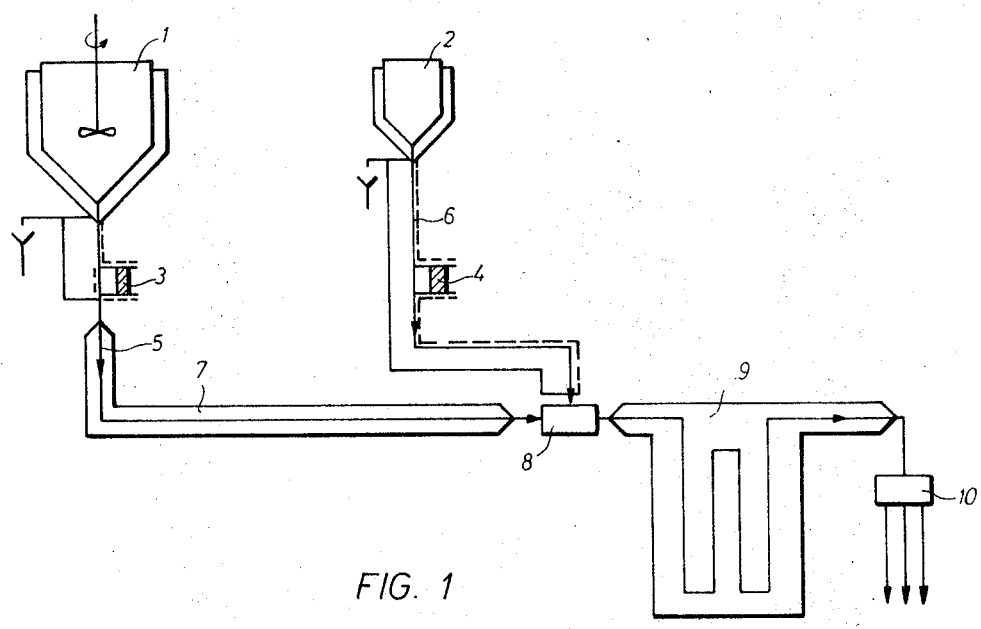

The present nivention relates to a process for the production of polyamides by continuous, alkaline catalysed polymerisation of lactams, and an apparatus for carrying out the process.

It is already known that anhydrous lactams of ω-aminocarboxylic acids can be polymerised in the presence of alkaline catalysts such as alkali metals or alkaline earth metals or their hydrides, oxides, hydroxides, carbonates or alcoholates, alkali metal alkyl compounds, alkaline earth metal alkyl compounds, alkali metal aryl compounds or alkaline earth metal aryl compounds, Grignard compounds or alkali metal or alkaline earth metal salts of unsubstituted or C-substituted lactams, at elevated temperatures to form high molecular weight linear polyamides.

The rate of polymerisation can be increased and/or the polymerisation temperature decreased by adding the usual polymerisation accelerators such as isocyanates or compounds which split off isocyanates, carbodiimides or cyanimides, e.g. by the process described in German patent specification No. 1,067,591, or acid derivatives such as benzoyl chloride, terephthaloyl chloride etc.

The polymerisation of lactams can be carried out at temperatures below the melting point of the corresponding polyamide, e.g. in a mould, and finished shaped products can thus be produced. The continuous production of filaments, films, webs, bristles and granulates for use in injection moulding machines, extruders or spinning apparatuses can only be achieved with considerable difficulty by this method because the transition from highly fluid monomeric lactam to solid polyamide takes place very rapidly and is accompanied by a contraction in volume.

Alkaline polymerisation of lactams at temperatures above the melting point of the corresponding polyamide, on the other hand, yields a liquid polyamide melt which can be worked up into filaments, films, webs, bristles and granulates in the usual manner, in a similar manner to hydrolytic polymerisation with the use of water or compounds that split off water as catalysts, but takes a much shorter time. When carrying out this process continuously, it has been proposed that one may introduce a lactam, an alkaline catalyst and, if desired, also a polymerisation accelerator, either individually or as a mixture, into the feed opening of a conventional extruder heated to the polymerisation temperature, in which extruder polymerisation then takes place. This process is commercially uneconomical and can easily lead to uncontrollable local overheating of the polyamide owing to the heat liberated by friction. It has also been proposed that one should jump a lactam which contains an alkaline catalyst and, if desired, a polymerisation accelerator, from one or from two storage vessels into a pressure pipe heated to the polymerisation temperature, in which pipe polymerisation then takes place. Since the pipe must have a small diameter section of considerable length in order both to ensure efficient and uniform transfer of heat from the wall of the pipe to the lactam and the polyamide and to obtain an efficient flow profile, relatively high pressures of up to 1000 excess atmospheres are produced in this process, which render the process commercially difficult to carry out.

It is an object of this invention, to provide, in the process for the production of polyamides by continuous polymerisation of cyclic lactams in the presence of alkaline catalysts and in the presence or in the absence of polymerisation accelerators the improvement which comprises preheating a lactam which is free from catalyst to a temperature of about 180 to about 280° C., introducing said preheated lactam and an alkaline catalyst separately into a mixing zone, mixing said preheated lactam and said alkaline catalyst, keeping the mixture thus obtained less than 10 seconds in the mixing zone, introducing said mixture into a reaction zone and polymerising said mixture under streaming and adiabatic conditions, the Reynold's number of said mixture under streaming conditions being above 20.

The mixture is polymerised under adiabatic conditions i.e. without external heat supply. The catalyst is preferably supplied in the form of a solution, for example in the lactam or in an inert organic solvent. The preheated lactam preferably contains a polymerisation accelerator. The temperature to which the lactam is heated in the preheater depends on the melting point of the polyamide and on the heat liberated during polymerisation of the lactam. It should be such that in the course of polymerisation a polyamide melt is formed which is at a temperature between the melting point and the decomposition point of the polyamide. In the case of polymerisation of caprolactam, e.g. if a preheating temperature of 180 to 280° C., preferably 200 to 250° C., is employed, a polyamide melt at temperatures between 220 and 300° C. preferably between 250 and 280° C., is obtained.

This continuous process enables lactams to be polymerised in the presence of alkaline catalysts and if desired also of the usual polymerisation accelerators (without the above-mentioned difficulties), if polymerisation is carried out adiabatically, that is to say without external heat supply. An apparatus for carrying out the process is shown in FIG. 1 of the accompanying drawings. It consists of a container 1 in which is placed most of the lactam (50 to 100% of the total amount) and if desired also a polymerisation accelerator in the form of a solution therein, a container 2 which contains the alkaline catalyst in the form of a solution in the lactam (up to 50% by weight of the total amount of lactam put into the process) or in an inert solvent, two metering pumps 3 and 4, supply pipes 5 and 6, a preheater 7 in which the catalyst-free lactam from container 1 can be heated to the desired temperature, a mixing apparatus 8 in which the hot lactam is homogeneously mixed with the catalyst, a reaction vessel 9 in which polymersation then occurs without external heat supply, and a spinning dye 10 from which the polyamide melt is drawn off in the form of a filament, band or bristle.

The containers 1 and 2 and the metering pumps 3 and 4 as well as the pipes are heated so that the lactam and the solution of alkaline catalyst in the lactam remain liquid.

Figure 2:
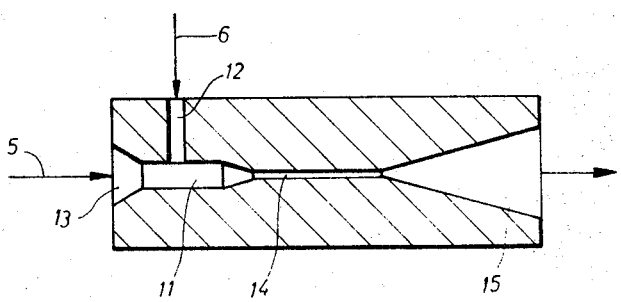

A mixing apparatus in which mixing is effected by high turbulence is preferably used. For example, an apparatus according to FIG. 2 of the accompanying drawings in which a mixing unit 11 into which the catalyst is introduced from pipe 6 via connecting piece 12 and the preheated lactam is introduced from pipe 5 via connecting piece 13, and a mixing capillary tube 14 immediately adjacent to 11 are provided may effectively be used. The dimensions of the mixing capillary tube 14 should be such that the Reynold's number of the lactam flowing through it is greater than 5000 and is preferably greater than 8000. The length of the mixing capillary 14 must be at least equal to the starting length $$L = 5 \times 10^5 \times \frac{\text{diameter}}{\text{Reynold's number}}$$

The product leaving the mixing capillary 15 can then be slowed down in a duct 15 (retarding portion) to the normal flow velocity in the reaction vessel 9.

The length of time which the lactam, homogeneously mixed with the catalyst, spends in the mixing apparatus 8 should be less than 10 seconds and is preferably less than 2 seconds in order to avoid any large scale polymerisation in the mixing apparatus.

Any reactors which provide sufficient dwelling time for the polymerisation mixture consisting of monomeric lactam and polyamide, may be used as reaction vessel 9. Reactors which fulfill these requirements are, for example, pipes with or without installations for detaching the marginal flow, multi-stage cascade tanks with stirrers or Cellar reactors.

In a preferred embodiment of the process according to the invention, the reaction vessel 9 employed is a pressure vessel in which the ratio of diameter to length is great as no further mixing or external heat supply is required. The ratio of diameter to length may be 0.02:1 or more. The Reynold's number of the stream of polymerisation mixture should not be less than 20 (based on the lactam) and is preferably above 100. Owing to the large diameter of this vessel, only a small pressure becomes established in the reaction pipe. The pressure pipe is only heated sufficiently to compensate for heat losses from the polyamide melt to the outside. The time of residence of the polyamide melt in the pressure pipe may lie between a few minutes and several hours and is preferably between 10 minutes and 2 hours.

The process according to the invention can be applied to lactams that have 4 to 13 ring members, e.g. pyrrolidone, caprolactam, caprylic lactam, lauric lactam, α-methylcaprolactam, γ-cyclohexylcaprolactam, trimethylcaprolactam etc., and if desired also to mixtures of two or more of these lactams. The lactams should be substantially free from water in order to avoid disturbances in the polymerisation.

The alkaline catalysts used are preferably alkali metal salts of lactams, e.g. the sodium salt of caprolactam, or the alkali metal salts of C-substituted lactams (e.g. the sodium salt of C-methyl-caprolactam) are preferred. The latter compounds are advantageously used in solution in an inert solvent, e.g. diisopropylbenzene, at a concentration between about 1 and about 50% by weight. The quantity of alkaline catalyst used is generally 0.001 to 10 mols percent, preferably 0.01 to 1 mol percent, based on the monomeric lactam.

The polymerisation accelerators which may be used are preferably isocyanates, e.g. phenylisocyanate, stearylisocyanate or cyclohexylisocyanate or compounds which split off isocyanates at higher temperatures, e.g. the addition compounds of isocyanates and lactams, alcohols, phenols or amines. The quantity of polymerisation accelerators used is generally 0.001 to 10 mols percent, preferably 0.01 to 1 mol percent based on the monomeric lactam.

In addition to the alkaline catalyst and to the polymerisation accelerator if used, an N-substituted carboxylic amide, for example caproic acid stearylamide, N,N-dimethylaminocaproic acid stearylamide, N-butylacetamide, or N-stearylbenzamide is advantageously added to the lactam as chain termination agent before the polymerisation is complete. The substance may be added either to the catalyst-free lactam in container 1 or to the catalyst solution in container 2. The amount of chain terminating agent is generally 0.01 to 5 mols percent, preferably 0.05 to 1 mol percent based on the monomeric lactam and depends on the desired degree of polymerisation of the polymer.

Apart from the above mentioned additives, the usual additives such as pigments, dyes, light stabilisers and heat stabilisers, optical brightening agents, plasticisers, crystallisation promoting agents etc. may be added to the lactam before polymerisation provided that they do not interfere with the course of polymerisation.

The polyamides prepared by the process according to the invention may either be worked up directly from the melt to form filaments, films, bands or wires or spun into bristles or granulated, and may then be freed from monomeric and oligomeric constituents by boiling with water and then dried. The granulate obtained can be worked in the usual way with injection moulding apparatuses, extruders or spinning apparatuses to form shaped articles, filaments, films, etc. which have excellent mechanical properties.

The following examples are to further illustrate the invention without limiting it.

EXAMPLE 1

Using an apparatus of the type illustrated in FIG. 1, 150 kg. of anhydrous molten caprolactam are introduced into the container 1 which is equipped with a stirrer and which is heated with warm water in a heating jacket to 80° C. 1174 g. of stearyl isocyanate (=0.3 mol percent based on caprolactam) and 1630 g. of N,N-dimethylaminocaproic acid stearylamide (=0.3 mol percent based on caprolactam) are then added and the mixture is stirred. The unheated container 2 is filled with a solution of sodium C-methylcaprolactam in diisopropylbenzene (concentration 2.5 mols per litre). The caprolactam mixed with polymerisation accelerator and chain terminating reagent is then pumped from the container 1 into the preheater 7 by means of the metering pump 3, and is then heated in the preheater to 240° C. It then enters a mixing apparatus 8 according to FIG. 2 which consists of a mixing chamber 11 in which the catalyst solution is pumped from container 2 into the stream of lactam obtained by means of the metering pump 4 in an amount corresponding to 0.1 mol percent of C-methylcaprolactam sodium based on caprolactam and a mixing capillary tube 14 immediately adjacent thereto which has a diameter of 0.5 mm. and a length of 24 mm.

The caprolactam and catalyst solution are homogeneously mixed in the capillary tube 14. The caprolactam is now ready for polymerisation and enters the reaction vessel 9 which consists of a pressure pipe which has a length of 15 metres and internal diameter of 3.65 cm., the jacket of which pipe is heated to 270° C., from the capillary tube 14. As polymerisation sets in immediately behind the capillary tube 14, a homogeneous polyamide melt which is at a temperature of 270° C. is formed. After flowing through the pressure pipe, this melt is spun through the spinning nozzles 10 into water as a bristle of about 3 mm. in diameter and is then granulated. The granulate is freed from monomeric and oligomeric constituents by extraction and is dried. The pressures produced at different rates of throughput and the relative viscosities of the resulting products (measured on a 1% solution in m-cresol at 25° C. in an Ubbelohde viscosimeter) are indicated in the following Table 1.

TABLE 1

| Output of pump 3, kg./h. | Output of pump 4, ml./h. | Pressure of capillary tube 14 | Pressure in reaction vessel 9 | Average time of stay in reaction vessel 9, min. | Relative viscosity of the polymer |
|---|---|---|---|---|---|
| 16 | 56 | [1] 34 | [1] 31 | 60 | 3.04 |
| 32 | 112 | [1] 63 | [1] 60 | 30 | 3.12 |

[1] Excess atmospheres.

The products obtained are colourless and can, for example, be worked up by injection moulding to produce shaped articles which have excellent mechanical strength.

EXAMPLE 2

Using the same apparatus as in Example 1, 150 kg. of anhydrous caprolactam are introduced into container 1. 586 g. of stearyl isocyanate (=0.15 mol percent based on caprolactam) and 534 g. of N-butylacetamide (=0.35 mol percent based on caprolactam) are then added and the mixture is stirred. The experimental conditions are otherwise the same as in Example 1.

The pressures produced by varying the rates of throughput and the relative viscosities of the products obtained are shown in the following Table 2.

TABLE 2

| Output of pump 3, kg./h. | Output of pump 4, ml./h. | Pressure of capillary tube 14 | Pressure in reaction vessel 9 | Average time of stay in reaction vessel 9, min. | Relative viscosity of the polymer |
|---|---|---|---|---|---|
| 16 | 56 | [1] 38 | [1] 35 | 60 | 3.01 |
| 24 | 84 | [1] 58 | [1] 55 | 40 | 31.0 |

[1] Excess atmospheres.

The products obtained are colourless and can be worked up, for example, by injection moulding techniques to produce shaped articles which have excellent mechanical strength.

What we claim is:

1. In the process for the production of polyamides by continuous polymerisation of cyclic lactams in the presence of alkaline catalysts and in the presence or in the absence of polymerisation accelerators the improvement which comprises preheating a lactam which is free from catalyst to a temperature of about 180 to about 280° C., introducing said preheated lactam and an alkaline catalyst separately into a mixing zone, mixing said preheated lactam and said alkaline catalyst, keeping the mixture thus obtained less than 10 seconds in the mixing zone, introducing said mixture into a reaction zone and polymerising said mixture under streaming and adiabatic conditions, the Reynold's number of said mixture under streaming conditions being above 20.

2. The improvement of claim 1, said mixing being effected under turbulent flow conditions.

3. The improvement of claim 1, said alkaline catalyst being introduced into the mixing zone in the form of a solution in an inert organic solvent.

4. The improvement of claim 1, said lactam which is free from catalyst containing an accelerator.

References Cited

UNITED STATES PATENTS

| 3,200,095 | 8/1965 | Wichterle et al. |
| 3,239,490 | 3/1966 | Gee et al. |
| 3,294,757 | 12/1966 | Church. |
| 3,309,343 | 3/1967 | Darnell et al. |

WILLIAM A. SHORT, Primary Examiner

L. M. PHYNES, Assistant Examiner